(12) United States Patent
Hazra

(10) Patent No.: US 6,414,994 B1
(45) Date of Patent: *Jul. 2, 2002

(54) METHOD AND APPARATUS FOR GENERATING SMOOTH RESIDUALS IN BLOCK MOTION COMPENSATED TRANSFORM-BASED VIDEO CODERS

(75) Inventor: Rajeeb Hazra, Tualatin, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/767,362

(22) Filed: Dec. 18, 1996

(51) Int. Cl.[7] .................................................. H04N 7/00
(52) U.S. Cl. .................................................. 375/240.16
(58) Field of Search ................................ 348/402, 413, 348/416, 699, 700, 701, 169, 170, 171; 346/699, 405; 395/600; 382/232, 300; 375/240, 240.01, 240.02, 240.1, 240.13, 240.15, 240.16; H04B 1/66

(56) References Cited

U.S. PATENT DOCUMENTS

| | | | | | |
|---|---|---|---|---|---|
| 5,019,901 A | * | 5/1991 | Umori et al. | ................ | 358/105 |
| 5,173,771 A | * | 12/1992 | Kitazato | ................ | 358/105 |
| 5,406,501 A | * | 4/1995 | Florent | ................ | 348/699 |
| 5,479,211 A | * | 12/1995 | Fukuda | ................ | 348/405 |
| 5,576,772 A | * | 11/1996 | Kondo | ................ | 348/699 |
| 5,696,551 A | * | 12/1997 | Katto | ................ | 348/43 |
| 5,793,443 A | * | 8/1998 | Aoki et al. | ................ | 348/699 |
| 5,802,361 A | * | 9/1998 | Wang et al. | ................ | 395/600 |
| 5,812,197 A | * | 9/1998 | Chan et al. | ................ | 348/416 |
| 5,917,964 A | * | 6/1999 | Normile | ................ | 382/300 |

* cited by examiner

Primary Examiner—Chris Kelley
Assistant Examiner—Tung Vo
(74) Attorney, Agent, or Firm—Kenyon & Kenyon

(57) ABSTRACT

A method and apparatus for identifying a prediction block which generates smooth residuals in block motion compensated transform-based video coders. A base block from a first image, and a candidate prediction block from a second image, are selected. A differential block is generated using the candidate prediction block and the base block. The differential block is passed through a filter. A total energy value for the filtered block is measured, and used for determining whether the candidate prediction block is selected.

18 Claims, 6 Drawing Sheets

METHOD AND APPARATUS FOR GENERATING SMOOTH RESIDUALS IN BLOCK MOTION COMPENSATED TRANSFORM-BASED VIDEO CODERS

BACKGROUND OF THE INVENTION

The invention relates generally to the compression of video signals. More particularly, the invention relates to a method and apparatus for generating smooth residuals in block motion compensated, transform-based video coders (BMT coders).

The demand for services such as video on demand and video conferencing is on the rise. To meet this demand, service providers are engineering ways of providing video signals over a variety of communications networks, such as the public switched telephone network (PSTN), the Integrated Service Digital Network (ISDN), the Internet, and cellular systems. The transmission of video signals, however, requires a larger amount of bandwidth than is available on these types of communications systems.

To solve this problem, these systems employ a video coder/decoder (codec or coder). A video coder compresses a digital video signal representing a video sequence, typically a frame or picture, by reducing the number of coded bits required to represent the video sequence while maintaining an acceptable viewing quality. This results in a lower transmission bit rate, but somewhat reduced visual quality.

Different communications systems require different degrees of compression. For example, a bit rate of 64 kilo-bits per second (Kbps) or lower is desirable for ISDN systems. The standard PSTN bandwidth requires an even lower bit rate of approximately 28.8 Kbps. Bit rates at these speeds, however, require a video coder to compress the information contained in a digital video sequence by a factor of 300 to 1, or more. To achieve such a large compression ratio requires the coder to remove a substantial amount of the redundancy inherent in the video sequence at the expense of quality.

One method of removing this redundancy is through the use of BMT coders. Current standards, such as International Telecommunications Union (ITU) H.261 (ITU-T1), International Standards Organization/International ElectroTechnical Committee (ISO/IEC) Motion Picture Expert Group One (MPEG-1) (ISO/IEC 11172-2), and MPEG-2 (ISO/IEC 13818-2) provide compression of a digital video sequence by utilizing a block motion-compensated Discrete Cosine Transform (DCT) approach. BMT coders remove the redundancy present in a video sequence using a combination of two compression techniques.

The first compression technique is referred to as motion compensated prediction coding (MCPC). MCPC takes advantage of the correlation of video frames in the time domain. The basic idea is to find the parts of each current frame that have moved or changed from a reference frame and code only the changes, which are called residuals. The reference frame can be a frame that is earlier or later in time than the current frame. Each current frame is then built by adding the decoded residuals to the prediction based on the reference frame.

MCPC employs a technique referred to as block matching. A portion of a current frame called a base block is selected. Typically, this block is an 8×8 or 16×16 matrix of pixels (or pels). A pixel is a single point in a picture or frame. The reference frame is then searched for a block which matches the base block to some degree of similarity. When a match is found, the location of the block in the reference frame is coded using motion vectors. This continues until all base blocks representing changes in the current frame are found in the reference frame. A trial predicted frame is then built by moving blocks from the reference frame using the motion vectors. The predicted frame is subtracted from the actual current frame to make a residual image, transformed using DCT coding (described below), and coded for transmission. At the receiving end, the process is reversed. The predicted frame is built from the reference frame, and the residual image is decoded and added to the predicted frame.

The second compression technique is referred to as DCT coding. DCT coding takes advantage of the intra-picture, two-dimensional correlation of a video signal. DCT coding orthogonally transforms a base block of the current frame, or a block of motion prediction errors, to the frequency domain. The signal power for the resultant block is concentrated in specific frequency components. Consequently, quantizing bits need only be allocated to the DCT coefficients in the region in which the signal power is concentrated. This further reduces the digital video signal required to represent the current frame. For example, in a region in which the image has little detail, and in which the video signal is thus highly correlated, the DCT coefficients are concentrated at low frequencies. In that case, only the DCT coefficients in the low-frequency region of the distribution pattern are quantized to reduce the quantity of the digital video signal.

In sum, a BMT coder compresses a video signal by matching a base block from a current video frame with blocks from a reference frame. The matched block is referred to as the prediction block. The coder generates a differential block using a base block and prediction block. The differential block represents the motion predicted error between the current and prediction blocks. The differential block is then transformed using a space-to-frequency domain transformation such as the Discrete Cosine Transform, quantized and finally, entropy coded. The coded residual along with location information (i.e., motion vectors) for the prediction block and quantization information forms the basis for decoding that particular block at the receiving end.

One of the keys to achieving good video coding efficiency lies in the BMT coder's ability to find the "best" prediction block. From an entropy encoding point of view, the best prediction block is the prediction block which will produce a differential block which can be represented by a minimum number of coded bits. While finding the best block is virtually impossible without spending considerable computational resources, many BMT coders attempt to find the best prediction block based on values derived from a block distortion measure. A block distortion measure quantifies the global dissimilarity between the current and prediction block. Examples of conventional block distortion measures include Sum of Absolute Differences (SAD), Sum of Weighted Differences (SWD) and the Mean Squared Error (MSE).

Conventional block distortion measures, however, are not designed to select a prediction block which fully enhances coding efficiency for BMT coders. The best prediction block for BMT coders is the one that produces the least number of bits for a given quantization level. Because entropy coding tables are generally designed such that higher frequency coefficients produce more bits than lower frequency coefficients, the best prediction block is often the one with the least number of high frequency coefficients. In other words, for BMT coders, the search for the best prediction block often implies searching for the block that produces the lowest amount of high frequency energy, or rather produces the smoothest residual. BMT coders using conventional block distortion measures, however, fail to factor in the amount of high frequency energy present in the associated differential block. Hence, the increase in coded bits decreases coding efficiency since more coded bits are used than necessary.

In view of the foregoing, it can be appreciated that a substantial need exists for a block distortion measure for use with a BMT coder for selecting a prediction block which produces a differential block having a minimal amount of high frequency energy, thereby increasing coding efficiency for a current frame.

SUMMARY OF THE INVENTION

This and other needs are met by a method and apparatus for identifying a prediction block which produces smooth residuals in BMT coders. A base block from a first image, and a candidate prediction block from a second image, are selected. A differential block is generated using the candidate prediction block and the base block. The differential block is passed through a filter. A total energy value for the filtered lock is measured, and forms the basis for selecting a prediction block.

DETAILED DESCRIPTION

Embodiments of the present invention include a block distortion measurement method and apparatus for identifying a prediction block from a reference frame which minimizes the amount of high frequency energy in the associated differential block. This results in fewer high-frequency transform coefficients being generated, thereby improving coding efficiency. Further, the block distortion measurement is flexible so that the quantification of smoothness can be adapted to the operating data rate, quantization level and bit-rate control. The block distortion measurement has applications in virtually all block motion compensated transform-based video coders such as H.261 coders, the MPEG family coders, as well as the more recently developed video conferencing coders such as the ITU-T Recommendation H.263.

Figure 1:
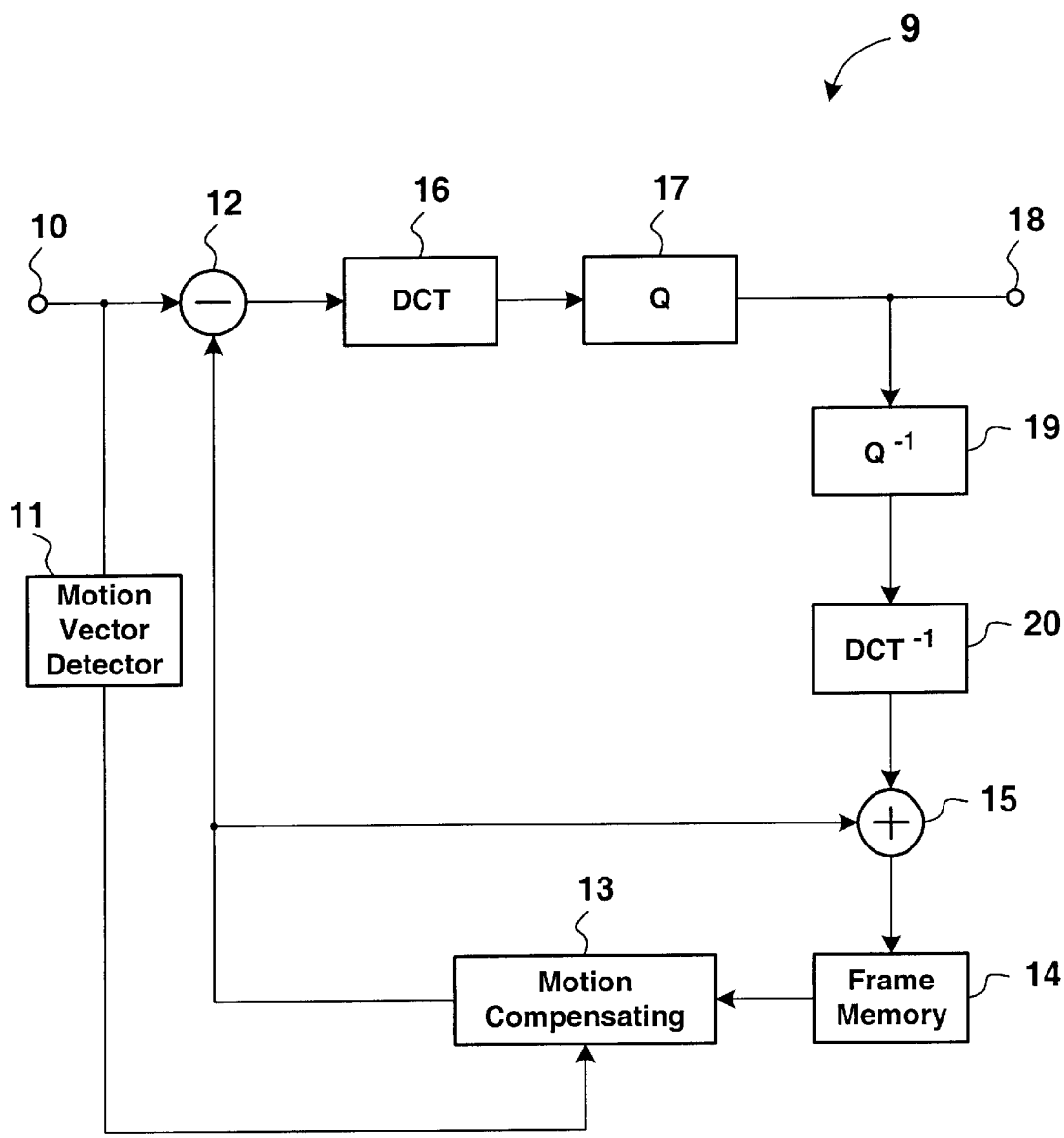
FIG. 1 illustrates a block-flow diagram of an embodiment of a block motion compensated transform-based video coder used in accordance with an embodiment of the invention.

Referring now in detail to the drawings wherein like parts are designated by like reference numerals throughout, there is illustrated in FIG. 1 a conventional predictive encoding circuit 9 using motion compensation. Digital video data for a current frame of video is supplied to an input terminal 10, which supplies the digital video data to a motion vector detecting circuit 11 and a subtracting circuit 12.

Motion vector detecting circuit 11 detects a motion vector for a block of the current frame relative to a reference frame, which may be a frame that temporally precedes or succeeds the current frame, and supplies the motion vector to a motion compensating circuit 13.

A frame memory 14 is adapted to store an image of the reference frame which, when motion compensated, forms the prediction for the present image. Frame memory 14 supplies this image to motion compensating circuit 13.

Motion compensating circuit 13 is operative to perform motion compensation of the image supplied thereto from frame memory 14 using the motion vector supplied thereto from motion vector detecting circuit 11, and to supply the motion compensated image to subtracting circuit 12 and an adding circuit 15. Specifically, motion compensating circuit 13 moves each block of the image to the position indicated by the corresponding motion vector.

Subtracting circuit 12 subtracts the motion compensated reference frame received from motion compensating circuit 13 from the video data of the current frame, on a pixel by pixel basis, to produce differential data and supplies the differential data to a DCT circuit 16.

DCT circuit 16 functions to orthogonally transform the differential data to produce coefficient data, and applies the coefficient data to a quantizing circuit 17. Quantizing circuit 17 is adapted to quantize the coefficient data and to supply the quantized coefficient data to an output terminal 18 and to an inverse quantizing circuit 19.

Inverse quantizing circuit 19 recovers the coefficient data from the quantized coefficient data, and applies the recovered coefficient data to an inverse DCT circuit 20 which converts the coefficient data to decoded differential image data and supplies the decoded differential image data to adding circuit 15.

Adding circuit 15 adds the decoded differential image data to the motion compensated image data from motion compensating circuit 13 to produce decoded image data and applies the decoded image data to frame memory 14 for storage therein.

Motion vector detecting circuit 11 uses a block matching method and apparatus to detect motion vectors. A prediction block of a reference frame is moved in a predetermined searching range to identify the block in the predetermined searching range that best matches a base block of the current frame. The comparison of a base block with a prediction block at a particular position in the predetermined search range comprises obtaining evaluating values using conventional block distortion measures such as SAD, SWD and MSE. The coder then detects the minimum of the evaluating values to identify the best matching block for transmitting and reconstituting the base block.

Conventional block distortion measures, however, do not factor in how much high frequency energy is present in a differential block created using a prediction block and the base block. Since high frequency energy typically requires a higher number of DCT coefficients, BMT coders using these block distortion measures often select a prediction block requiring a greater number of coded bits than necessary. This concept is illustrated in more detail with reference to FIGS. 2 and 3.

Figure 2:
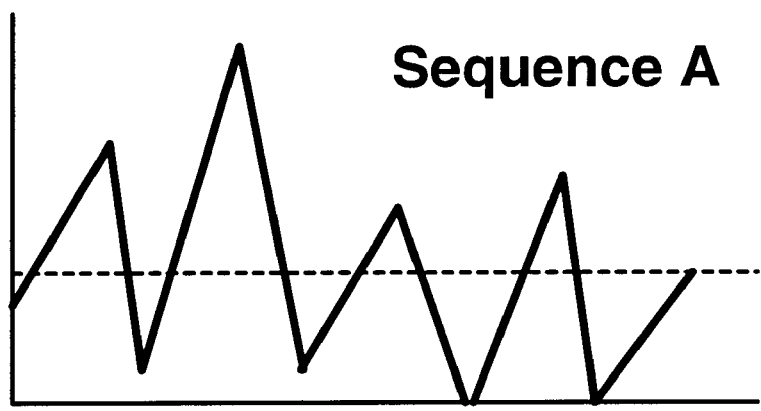
FIG. 2 is an amplitude over time plotting of a first one-dimensional residual sequence (A).
Figure 3:
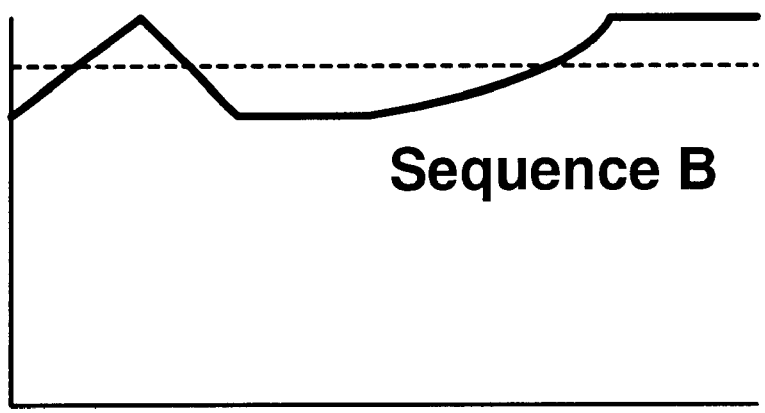
FIG. 3 is an amplitude over time plotting of a second one-dimensional residual sequence (B).

FIG. 2 is an amplitude over time plotting of a first one-dimensional residual sequence (A). FIG. 3 is an amplitude over time plotting of a second one-dimensional residual sequence (B). In comparing sequences, it can be appreciated that sequence (A) has a lower average difference than sequence (B), both of which are indicated by dotted lines. A coder using a conventional block distortion measure such as SAD would select the candidate prediction block corresponding to sequence (A). Sequence (A), however, has a larger number of higher frequencies than sequence (B), and thus would produce significantly more DCT coefficients.

These additional DCT coefficients would in turn require more coded bits than sequence (B).

Accordingly, an embodiment of the invention includes a motion vector detecting circuit which uses a block distortion measure providing a value indicating the amount of high frequency energy within a differential block formed from a base block and a candidate prediction block, the value forming a basis for selecting the best prediction block from a group of candidate prediction blocks within a predetermined range.

Figure 4:
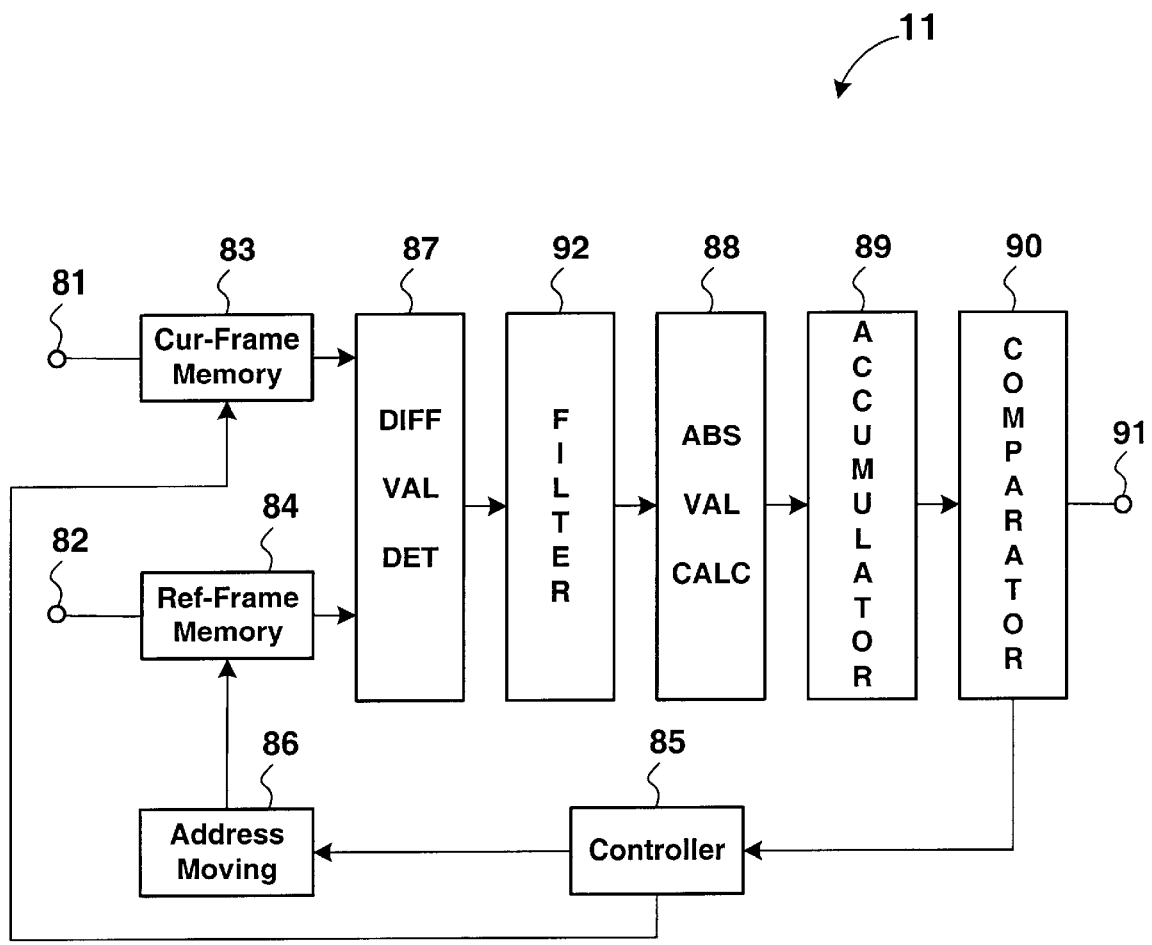
FIG. 4 is an embodiment of a motion vector detecting circuit used in accordance with an embodiment of the invention.

FIG. 4 is an embodiment of a motion vector detecting circuit used in accordance with an embodiment of the invention. FIG. 4 shows a motion vector detecting circuit 11. Image data for a current frame is applied to an input terminal 81, which supplies the image data to a current frame memory 83 for storage. Image data for a reference frame is applied to an input terminal 82, which supplies the image data to a reference frame memory 84 for storage.

A controller 85 controls reading and writing of current frame memory 83 and reference frame memory 84, which respectively supply pixel data of a base block of the current frame and pixel data of a candidate prediction block of the reference frame to a differential value detecting circuit 87. An address moving circuit 86 is associated with reference frame memory 84. Controller 85 controls address moving circuit 86 to apply read addresses to reference frame memory 84 which move, pixel by pixel, the position of the candidate prediction block in the predetermined searching range.

A differential value detecting circuit 87 obtains the differential value between the output signals of current frame memory 83 and reference frame memory 84 on a pixel by pixel basis and supplies the differential values to a filter 92. Filter 92 passes the filtered differential values to an absolute value calculating circuit 88, which obtains the absolute value of the filtered differential values and supplies the absolute value to an accumulator circuit 89. Accumulator circuit 89 sums the absolute values of the filtered differential values for each block to produce a total energy value (T) for the base block relative to the candidate prediction block at a particular position in the predetermined search range and supplies T to a comparator circuit 90.

Comparator circuit 90 identifies a predetermined minimum threshold value in the predetermined search range. The best matching block in the predetermined search range of the reference frame corresponds to the predetermined minimum threshold value. Comparator circuit 90 also produces a motion vector between the base block of the current frame and the best candidate prediction block in the predetermined search range of the reference frame.

Describing the operation of motion vector detecting circuit 11 in more detail, circuit 11 selects a candidate prediction block for a given base block of a current frame. A differential block is generated using the candidate prediction block and base block. One method of generating this differential block is by pel differencing. This particular embodiment uses algebraic differencing so that the differential block may have both positive and negative values.

Filter 92 is a high-pass filter and is used to filter low frequency energy from each differential block. The high-pass filter can be implemented in either hardware or software. A software based filter can be implemented using any standard software filtering technique. For example, a software high-pass filter may be implemented by linear finite impulse response (FIR) filtering, also known as convolution, using the following equation:

$$g[m,n] = \frac{1}{MN} \sum_{m'=-M}^{M} \sum_{n'=-N}^{N} S[m',n']F[m-m',n-n']$$

where g[m,n] represents the output values, S[m',n'] represents the input values, and F[m-m',n-n'] represents the filter kernal. The filter may use a small high-pass filter kernel such as the two dimensional Laplacian kernel. Typically, the filter is small to keep the computational load low. In many cases, a 3×3 or a 5×5 tap filter may be needed. The following is an example of an advantageous 3×3 filter tap (C):

| -1 | 0 | -1 |
| --- | --- | --- |
| 0 | 4 | 0 |
| -1 | 0 | -1 |

By choosing different high-pass filters with varying degrees of high-pass modulation, one can emphasize or de-emphasize the notion of a smooth residual. In this embodiment, the high pass. filter uses filter taps with a range between X=−4 and Y=16, with a preferred range within A=−1 and B=2, and an advantageous filter tap of C given above.

The resultant high-pass filtered blocks will have small (pel-scale) features exaggerated while low-frequency features will be subdued. In the frequency domain, this is analogous to using a weighting function that weights the high frequency components more than the low frequency components.

Accumulator circuit 89 computes a total energy (T) for each high-pass filtered block by squaring each pel difference value and accumulating a total of the squared values. The following general formula is used to compute T:

$$T = \frac{1}{N} \sum_{n=0}^{n-1} \sum_{m=0}^{m-1} |f(x,y)|^2$$

This particular embodiment uses a block comprising a 16×16 matrix of pixels. Thus, T is computed as follows:

$$T = \frac{1}{256} \sum_{n=0}^{15} \sum_{m=0}^{15} |f(x,y)|^2$$

Comparator 90 determines whether the candidate prediction block's T is lower than (or equal to) a predetermined threshold value. The predetermined threshold value may be a value representing operating data rate, quantization level, bit-rate control, or any other desirable system parameter. If T is lower than (or equal to) the predetermined threshold, comparator 90 identifies the candidate prediction block as the best candidate prediction block. Otherwise, motion vector predicting circuit 11 continues searching for another candidate prediction block producing a T which is lower than (or equal to) the predetermined threshold value.

Figure 5:
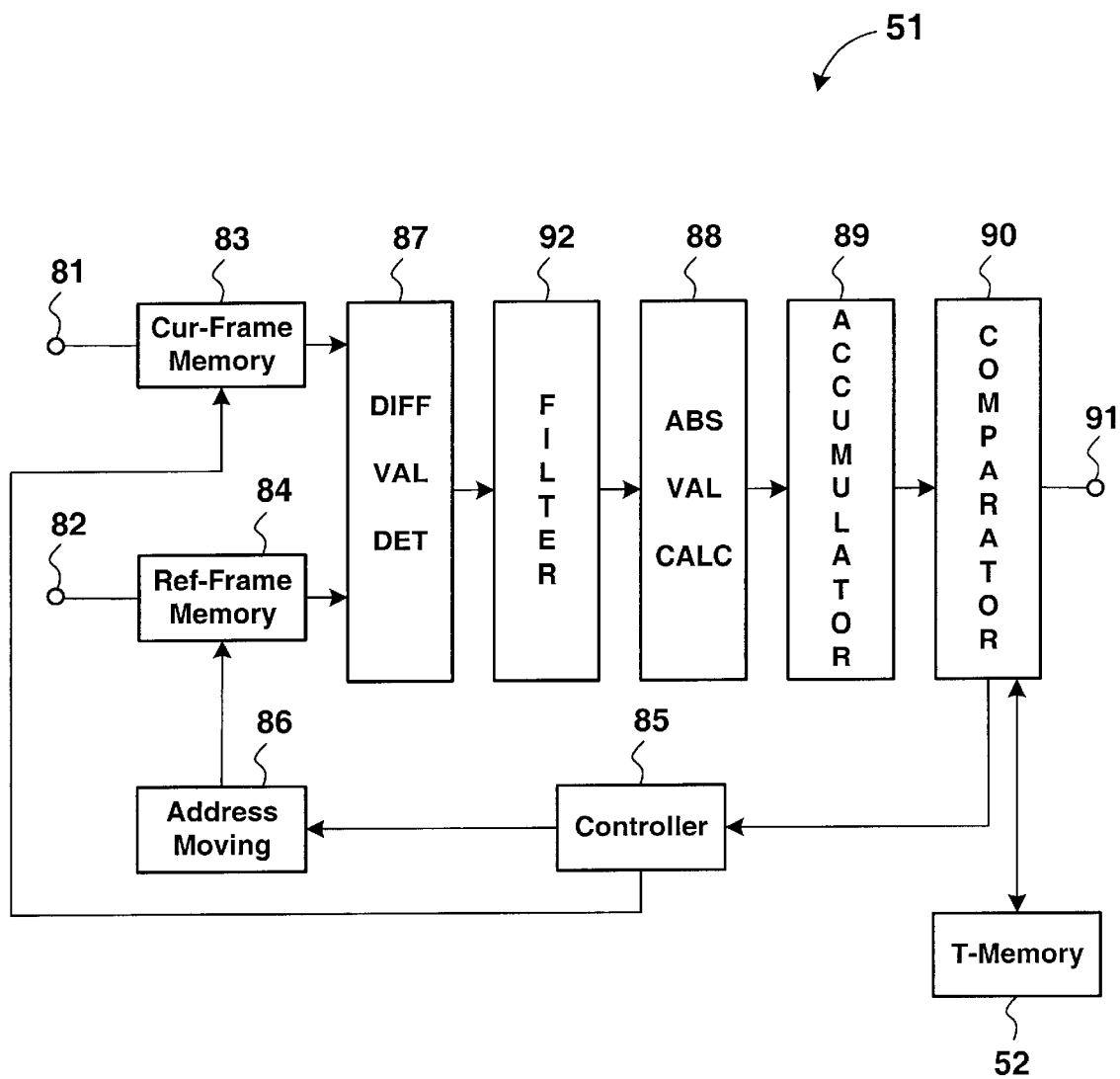
FIG. 5 is an embodiment of a motion vector detecting circuit which may be used in accordance with another embodiment of the invention.

FIG. 5 is an embodiment of a motion vector detecting circuit which may be used in accordance with another embodiment of the invention. FIG. 5 shows a motion vector detecting circuit 51. This embodiment of circuit 51 is identical to the embodiment of FIG. 4, except that circuit 51 has a T-memory 52 coupled to comparator 90. In operation, circuit 51 is also similar to circuit 11, except that instead of comparator circuit 90 comparing T to a predetermined minimum threshold value, comparator 90 stores T in T-memory 52 for each candidate prediction block within a predetermined search range, compares each T stored in T-memory, and selects a candidate prediction block producing the lowest T (MIN) as the best candidate prediction block.

Figure 6:
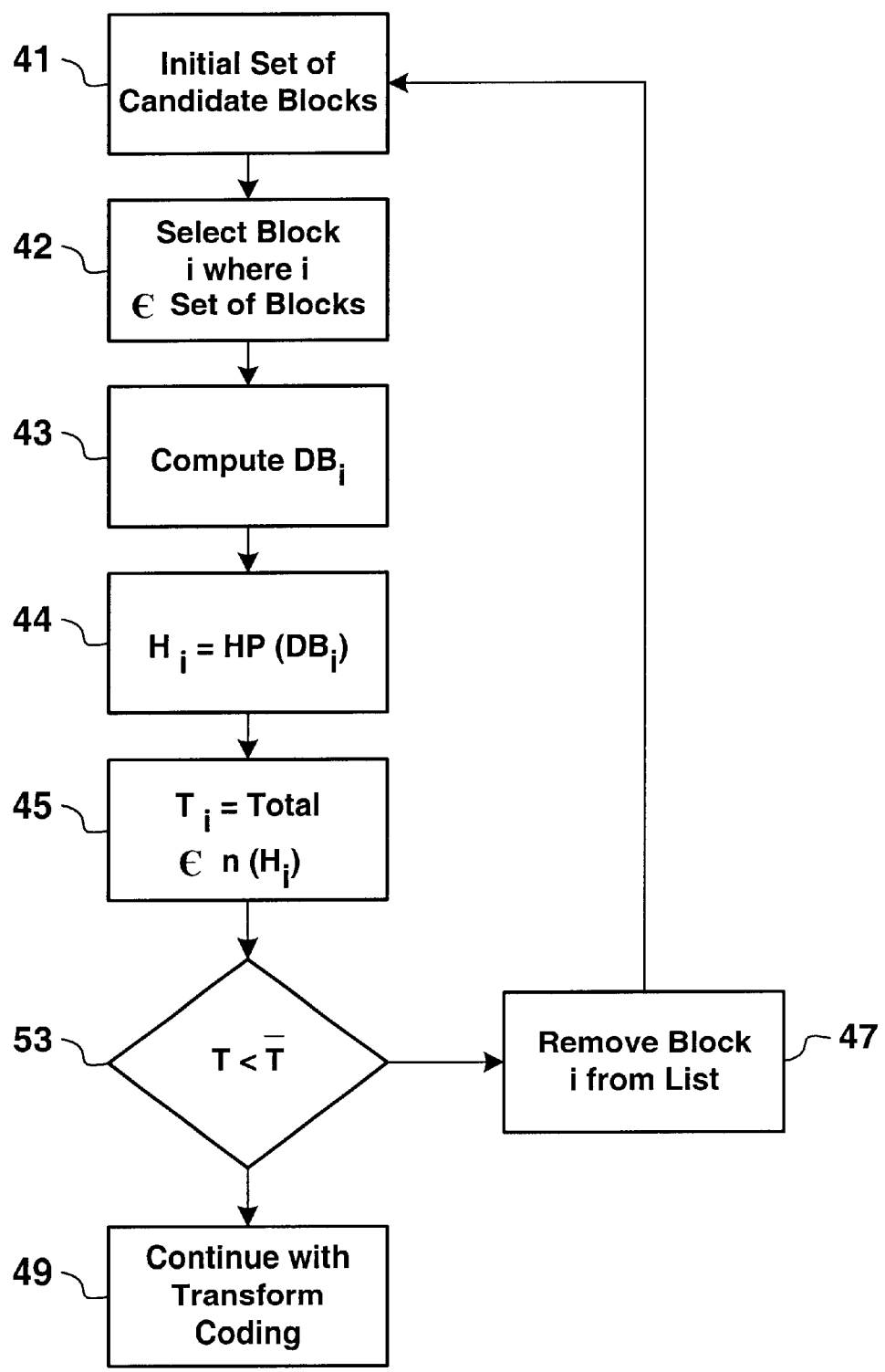
FIG. 6 is a block flow diagram of a block distortion measurement algorithm used in accordance with an embodiment of the invention.

FIG. 6 is a block flow diagram of a block distortion measurement algorithm used in accordance with an embodiment of the invention. At step 41, an initial set of candidate blocks is selected according to a predetermined search range. At step 42, candidate prediction block i is selected where i is a block within the initial set. A difference block i ($Db_i$) is computed using candidate prediction block i and a base block from the current frame at step 43. The difference block $Db_i$ is put through a high-pass filter similar to that used in the embodiment discussed with reference to FIG. 4, resulting in filtered difference block ($H_i$) at step 44. At step 45, a total energy value for $H_i$ ($T_i$) is generated using the same formula used in the embodiment described with reference to FIG. 4. At step 53, a test is conducted to determine whether T is less than a predetermined minimum threshold value. If not, block i is removed from the predetermined search list, and the block distortion measurement algorithm selects another candidate prediction block at step 41. If T is less than the predetermined minimum threshold value, then transform coding is continued at step 49.

Figure 7:
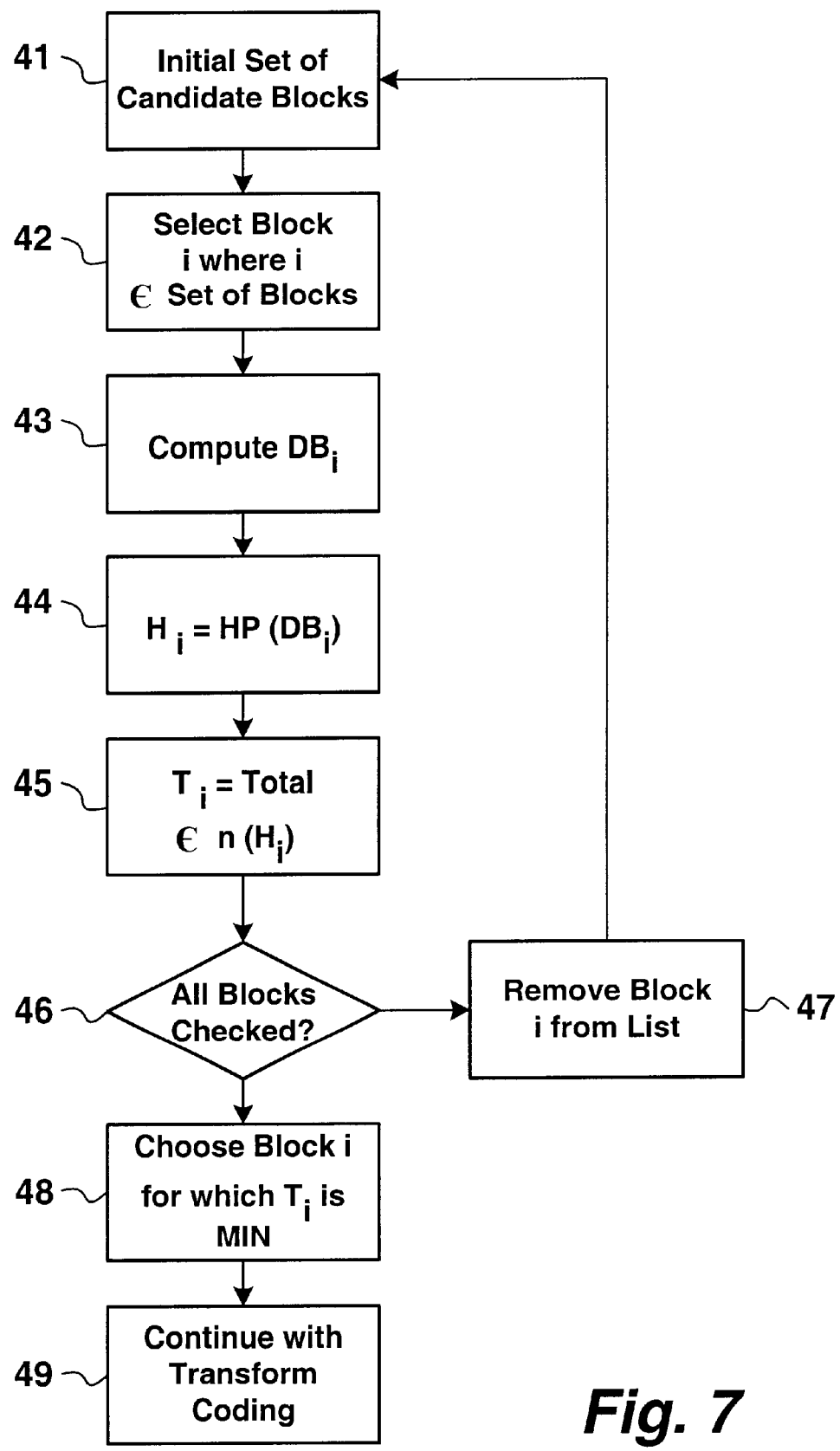
FIG. 7 is a block flow diagram of a block distortion measurement algorithm in accordance with another embodiment of the invention.

FIG. 7 is a block flow diagram of a block distortion measurement algorithm in accordance with another embodiment of the invention. Steps 41, 42, 43, 44, 45, 47 and 49 of the block distortion measurement algorithm shown in FIG. 7 are identical to steps 41, 42, 43, 44, 45, 47 and 49 of the algorithm shown in FIG. 6. At step 53, a test is conducted to determine whether a T for all the candidate blocks within the predetermined search range has been computed. If not, block i is removed from the list at step 47, and another candidate block is selected at step 41. If yes, each T is compared, and the candidate selection block is selected where $T_i$ is lowest (MIN) at step 48. Predictive encoding circuit 9 continues transform coding the best prediction block at step 49.

It is worthy to note that the illustrated embodiments of the invention result in the selection of a prediction block which generates a differential block requiring a minimal amount of coded bits for transmitting information required to reconstruct the base block at the receiving end. Thus, referring again to sequences (A) and (B) shown in FIGS. 2 and 3, respectively, the block distortion measurement algorithm results in differential blocks of type (B) having a smaller value of T than blocks of type (A).

It is also worthy to note that although the illustrated embodiments of the invention are described using a high-pass filter, these same embodiments can be implemented using a low-pass filter. The implementation and advantages would be identical to the above-described embodiments, except that the best candidate prediction block would be selected with a T higher than the predetermined minimum threshold value, or having the highest T (MAX). It is also worthy to note that any conventional comparison method can be used in embodiments of the invention as long as an appropriate prediction block is selected which produces a desired smooth residual. It can also be appreciated that embodiments of the invention can be implemented in either software or hardware.

Although embodiments are specifically illustrated and described herein, it will be appreciated that modifications and variations of the present invention are covered by the above teachings and within the purview of the appended claims without departing from the spirit and intended scope of the invention. For example, it can be appreciated that a high-pass filter can be implemented in either hardware or software. Further, although FIG. 1 discusses a specific BMT coder, it can be appreciated that any block motion compensated transform-based video coder using the above-described block distortion measurement falls within the scope of the invention.

What is claimed is:

1. A method for selecting a prediction block for use in motion compensated prediction coding, comprising the steps of:
   generating a differential block having differential values from a base block and a prediction block;
   determining an amount of high frequency energy within said differential block by
      filtering low-frequency energy from said differential block; and
      measuring a total energy value for said filtered differential block by squaring each differential value for said differential block and accumulating a total of said squared values, wherein said step of measuring said total energy value (T) uses a formula:

$$T = \frac{1}{N}\sum_{n=0}^{n-1}\sum_{m=0}^{m-1} |f(x, y)|^2$$

and
   selecting said prediction block based on said determination by comparing said total energy value with a predetermined value.

2. The method of claim 1, wherein said step of selecting comprises the step of:
   selecting said prediction block in accordance with said total energy value.

3. The method of claim 2, wherein said step of selecting said prediction block in accordance with said total energy value comprises
   selecting said prediction block in accordance with said comparison, wherein said predetermined value is a predetermined threshold.

4. The method of claim 2, wherein a total energy value for another differential block generated using another prediction block was previously stored in memory, and wherein said step of selecting said prediction block in accordance with said total energy value comprises the steps of:
   comparing said total energy values within said predetermined value, wherein said predetermined value is a predetermined search range; and
   selecting one of said prediction blocks in accordance with said comparison.

5. The method of claim 1, wherein said differential values are comprised of pel values.

6. The method of claim 1, wherein said step of determining comprises the steps of:
   filtering high-frequency energy from said differential block; and
   measuring a high-frequency total energy value for said filtered differential block.

7. An apparatus to identify a prediction block for use in motion-compensated prediction coding, comprising:
   a differential value detector to generate a differential block having differential values between a base block and a prediction block;
   a first circuit to determine an amount of high frequency energy within said differential block, said first circuit comprising a linear finite impulse response filter to filter said differential values and isolate those values representing a predetermined energy level, and an accumulator circuit that squares said isolated differential values to generate a total energy value, wherein said linear finite impulse response filter uses a formula:

$$g[m,n] = \frac{1}{MN} \sum_{m'=-M}^{M} \sum_{n'=-N}^{N} S[m',n']F[m-m',n-n']$$

where g[m,n] represents the output values, S[m',n'] represents the input values, and F[m−m',n−n'] represents a filter kernal; and
   a second circuit including a comparator to compare said total energy value with a predetermined threshold to select said prediction block based on said determination.

8. The apparatus of claim 7, wherein said filter kernal is a two dimensional Laplacian kernal.

9. The apparatus of claim 7, wherein said filter uses a tap size of at least one of 3×3 tap size or 5×5 tap size.

10. The apparatus of claim 7, wherein said filter uses filter taps with a range between X and Y, with a preferred range within A and B, and an advantageous tap of C.

11. The apparatus of claim 7, wherein said accumulator generates said total energy value according to a formula:

$$T = \frac{1}{N} \sum_{n=0}^{n-1} \sum_{m=0}^{m-1} |f(x,y)|^2.$$

12. The apparatus of claim 7, wherein said differential value detector generates differential values by pel differencing.

13. A computer-readable medium having stored thereon instructions which, when executed by a processor, cause the processor to perform steps for selecting a prediction block for use in motion compensated prediction coding, said algorithm comprising the steps of:
   generating a differential block having differential values from a base block and a prediction block;
   determining an amount of high frequency energy within said differential block by
   filtering low-frequency energy from said differential block;
   measuring a total energy value for said filtered differential block by squaring each differential value for said differential block and accumulating a total of said squared values, wherein said step of measuring said total energy value (T) uses a formula:

$$T = \frac{1}{N} \sum_{n=0}^{n-1} \sum_{m=0}^{m-1} |f(x,y)|^2$$

and
   selecting said prediction block based on said determination by comparing said total energy value with a predetermined value.

14. The computer-readable medium of claim 13, wherein said step of selecting comprises the step of:
   selecting said prediction block in accordance with said total energy value.

15. The computer-readable medium of claim 14, wherein said step of selecting said prediction block in accordance with said total energy value comprises
   selecting said prediction block in accordance with said comparison, wherein said predetermined value is a predetermined threshold.

16. The computer-readable medium of claim 14, wherein a total energy value for another differential block generated using another prediction block was previously stored in memory, and wherein said step of selecting said prediction block in accordance with said total energy value comprises the steps of:
   comparing said total energy values within said predetermined value, wherein said predetermined value is a predetermined search range; and
   selecting one of said prediction blocks in accordance with said comparison.

17. The computer-readable medium of claim 13, wherein said differential values are comprised of pel values.

18. The computer-readable medium of claim 13, wherein said step of determining comprises the steps of:
   filtering high-frequency energy from said differential block;
   measuring a high-frequency total energy value for said filtered differential block; and
   selecting said prediction block in accordance with said total energy value.

* * * * *

UNITED STATES PATENT AND TRADEMARK OFFICE
CERTIFICATE OF CORRECTION

PATENT NO. : 6,414,994 B1
DATED : July 2, 2002
INVENTOR(S) : Hazra

It is certified that error appears in the above-identified patent and that said Letters Patent is hereby corrected as shown below:

Column 9,
Lines 20, 25 and 26, "kernal" should be -- kernel --

Signed and Sealed this

Sixth Day of May, 2003

JAMES E. ROGAN
*Director of the United States Patent and Trademark Office*